United States Patent
Tsai et al.

(10) Patent No.: US 9,554,407 B2
(45) Date of Patent: Jan. 24, 2017

(54) LINKING METHOD BETWEEN COMMUNICATION DEVICES AND RELATED MACHINE READABLE MEDIUM

(71) Applicant: MEDIATEK INC., Hsin-Chu (TW)

(72) Inventors: Yu-Che Tsai, Hsinchu (TW); Shao-Wei Chen, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 214 days.

(21) Appl. No.: 14/251,665

(22) Filed: Apr. 14, 2014

(65) Prior Publication Data
US 2014/0341111 A1  Nov. 20, 2014

Related U.S. Application Data

(60) Provisional application No. 61/825,131, filed on May 20, 2013.

(51) Int. Cl.
*H04W 76/02* (2009.01)
*H04W 8/00* (2009.01)
*H04W 8/26* (2009.01)
*H04L 29/12* (2006.01)

(52) U.S. Cl.
CPC ........... *H04W 76/023* (2013.01); *H04W 8/005* (2013.01); *H04L 61/2007* (2013.01); *H04W 8/26* (2013.01)

(58) Field of Classification Search
CPC .. H04W 76/023; H04W 76/02; H04W 76/021; H04W 76/043; H04W 8/005
See application file for complete search history.

(56) References Cited

U.S. PATENT DOCUMENTS

| | | | |
|---|---|---|---|
| 2005/0010769 A1* | 1/2005 | You | G06F 21/33 713/168 |
| 2011/0145397 A1* | 6/2011 | Burns | H04L 29/1249 709/224 |
| 2012/0201251 A1* | 8/2012 | Kim | H04W 40/02 370/400 |
| 2012/0290731 A1 | 11/2012 | Suumäki | |

FOREIGN PATENT DOCUMENTS

| EP | 2 833 658 A1 | 2/2015 |
|---|---|---|
| WO | 2013145045 A1 | 10/2013 |

* cited by examiner

*Primary Examiner* — Chi H Pham
*Assistant Examiner* — Weibin Huang
(74) *Attorney, Agent, or Firm* — Winston Hsu; Scott Margo (57) ABSTRACT

A linking method employed by a first communication device includes: transmitting a first network domain information to a second communication device before/after a link with the second communication device is established; receiving a second network domain information from the second communication device before/after the link with the second communication device is established; and when the first communication device is decided to be a group owner before/after the link with the second communication device is established, determining a network domain address of the link according to the first network domain information and the second network domain information.

8 Claims, 6 Drawing Sheets

LINKING METHOD BETWEEN COMMUNICATION DEVICES AND RELATED MACHINE READABLE MEDIUM

CROSS REFERENCE TO RELATED APPLICATIONS

This application claims the benefits of U.S. Provisional No. 61/825,131, which was filed on 2013 May 20 and is incorporated herein by reference in its entirety.

BACKGROUND

The present disclosure relates generally to establishing a link between communication devices, and more specifically to a linking method with network domain information exchange mechanism and a related machine readable medium.

Applications that enable devices to directly connect with each other without requiring an intermediate device are growing popular. For instance, Wi-Fi Direct (initially called Wi-Fi P2P) is a Wi-Fi standard that enables devices to connect easily with each other without requiring a wireless access point, enabling communication at typical Wi-Fi speeds for everything from file transfer to Internet connectivity. Wi-Fi Direct devices can connect one-to-one or one-to-many, which means that the Wi-Fi Direct devices may have more than one link at the same time.

In the course of forming a link between two Wi-Fi Direct devices, the two devices will not realize the information associated with already existing link(s). As a result, an IP conflict may take place when a same IP domain as that of any existing link(s) is assigned when the new link is established. In this case, the condition that one of the Wi-Fi Direct devices has two links assigned with the same IP domain address at the same time will take place and cause a problem. Conventionally, the best option is to manually adjust these IP domain addresses so as to avoid conflicts. Such a solution is inefficient and troublesome, however, since the conflicts may remain unsolved for a long time and keep users waiting. The IP conflict issue in the field of P2P applications therefore needs to be addressed.

SUMMARY

In accordance with exemplary embodiments of the present invention, a linking method and a related machine readable medium are proposed to solve the above-mentioned problems.

According to a first aspect of the present invention, an exemplary linking method employed by a first communication device is disclosed. The linking method comprises: transmitting a first network domain information to a second communication device before/after a link with the second communication device is established; and receiving a second network domain information from the second communication device before/after the link with the second communication device is established.

According to a second aspect of the present invention, an exemplary linking method for a communication system is disclosed. The link method comprises: controlling the first communication device to transmit a first network domain information to the second communication device before/after a link between the first communication device and the second communication device is established; and controlling the second communication device to transmit a second network domain information to the first communication device before/after the link between the first communication device and the second communication device is established.

According to a third aspect of the present invention, an exemplary linking method employed by a first communication device is disclosed. The method comprises: when the first communication device is decided to be a group owner before/after the link with a second communication device is established, determining a network domain address of the link in a random manner; and transmitting the network domain address to the second communication device before/after the link with the second communication device is established.

According to a fourth aspect of the present invention, an exemplary linking method for a communication system is disclosed. The link method comprises: when a group owner is decided from the first communication device and the second communication device before/after the link between the first communication device and the second communication device is established, controlling the group owner to determine a network domain address of the link in a random manner; and controlling the group owner to transmit the network domain address to a group client before/after the link between the first communication device and the second communication device is established, wherein the group client is one of the first communication device and the second communication device apart from the group owner.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

One of the technical features of the present invention is to avoid IP domain address conflict when establishing a link between P2P devices such as two Wi-Fi Direct devices. Two main methods are disclosed, wherein one method comprises exchanging each device's network domain information concerning existing links while performing link formation or link negotiation; and the other method comprises determining a network domain address in a random manner while performing link formation or link negotiation. Further details are described in the following.

Figure 1:
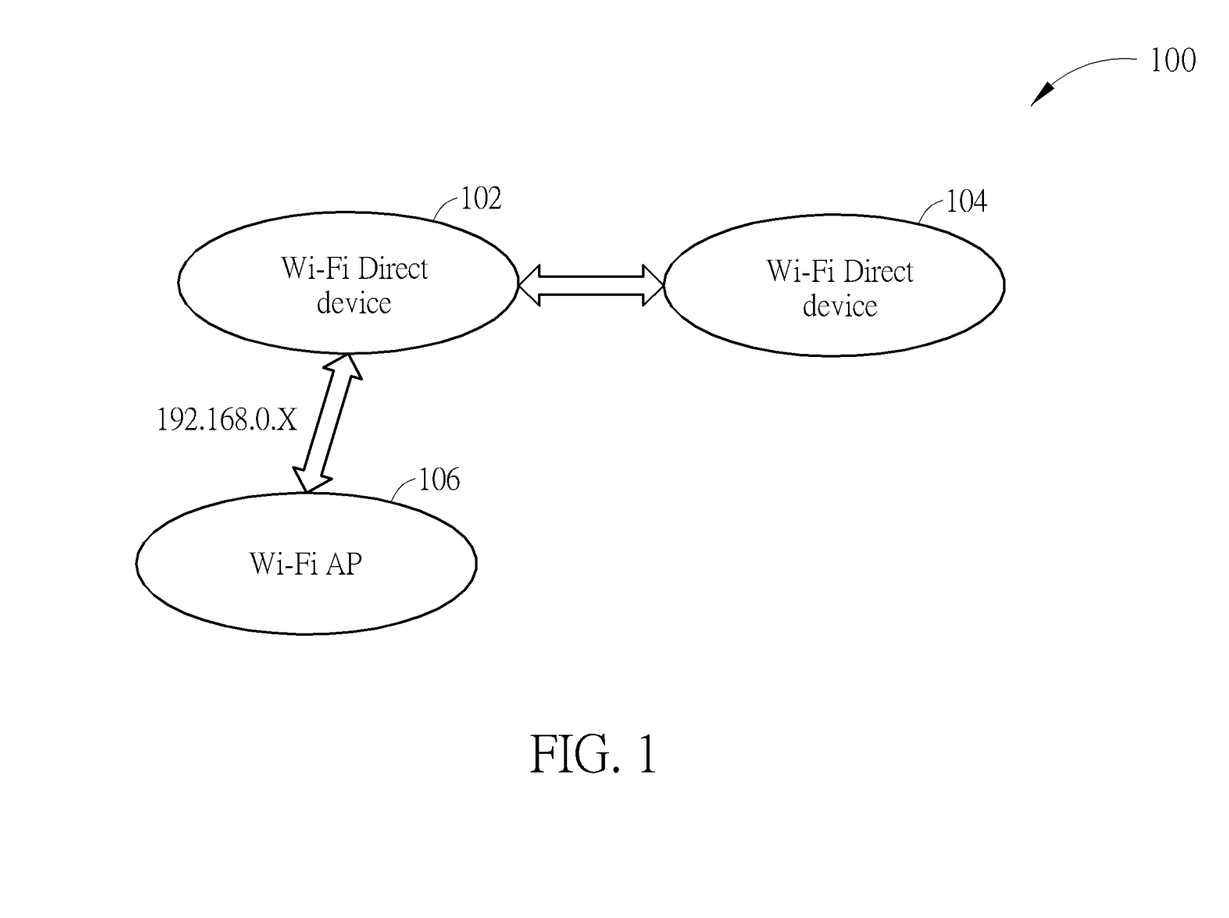
FIG. 1 is a diagram illustrating an example of performing link formation between two Wi-Fi Direct devices.

For better understanding of the technical features of the present invention, please refer to FIG. 1, which is a diagram illustrating link formation between two Wi-Fi Direct devices. Suppose a Wi-Fi Direct device 102 and a Wi-Fi Direct device 104 in a communication system 100 are performing link formation as a result of the Wi-Fi Direct device 102 inviting the Wi-Fi Direct device 104 or vice versa. In the course of the formation process according to the Wi-Fi Direct standard, one of the two Wi-Fi Direct devices 102 and 104 will be the Group Owner (GO), while the other will be the Group Client (GC). Conventionally, a network domain address is assigned by the GO unilaterally, and the network domain addresses are often generated monotonously and prone to repeat. In contrast to the conventional design, the present invention proposes exchanging network domain information between the two link partners, the network domain information indicating a network domain address of each link currently used by the two link partners (i.e. the GO and the GC), and using this information as the basis of further actions.

As shown in FIG. 1, the Wi-Fi Direct device 102 has an existing link with a Wi-Fi access point (AP) 106, and the network domain address assigned to the link is, for example, 192.168.0.X. According to the present invention, the Wi-Fi Direct device 102 transmits network domain information to the Wi-Fi Direct device 104 to notify the Wi-Fi Direct device 104 that a network domain address 192.168.0.X is occupied and should not be reassigned till the link with the Wi-Fi AP 106 is disconnected, to prevent IP address conflict. The Wi-Fi Direct device 104 may also transmit network domain information to the Wi-Fi Direct device 102 to notify the Wi-Fi Direct device 102 that no network domain address is currently used or occupied by the Wi-Fi Direct device 104. The network domain information sent by the Wi-Fi Direct device 104 indicates a network domain address of each link currently used by the Wi-Fi Direct device 104; similarly, the network domain information sent by the Wi-Fi Direct device 102 may indicate a network domain address of each link currently used by the Wi-Fi Direct device 102. Moreover, the network domain information may also include network domain addresses used by other devices connected to the Wi-Fi Direct devices 102 and/or 104. With the help of the exchanged network domain information, both the Wi-Fi Direct device 102 and the Wi-Fi Direct device 104 are capable of grasping the instant usage situation of the respective network domain addresses.

After the GO is determined, the GO will determine whether to establish a new link between the Wi-Fi Direct device 102 and the Wi-Fi Direct device 104. For instance, if the network domain address is manually forced by a user and the GO judges that the manually forced address will cause IP address conflict, the GO may determine not to establish the new link between the Wi-Fi Direct device 102 and the Wi-Fi Direct device 104. This is for illustrative purposes only, and not a limitation of the present invention. If the GO determines that the situation is qualified and it is safe to establish the new link under provisions of the standard it complies with, the GO will determine a network domain address of the link according to the network domain information of GO and GC. Specifically, the GO will select a specific network domain address different from 192.168.0.X as the network domain address for the new link between the Wi-Fi Direct device 102 and the Wi-Fi Direct device 104. IP address conflict can be easily avoided without requiring too much effort and time. If the GO has run out of IP addresses, i.e. no more different IP addresses can be provided for the new link, the GO may determine not to establish the new link. It should be noted that applying the proposed link formation method with reference to exchanged domain address information to Wi-Fi Direct devices is not meant to be a limitation of the present invention. By way of example, but not a limitation, the present invention may be applied to other wireless P2P standards, or even wired (cable) internet systems, and these applications employing the proposed link formation method all fall within the scope of the present invention.

Figure 2:
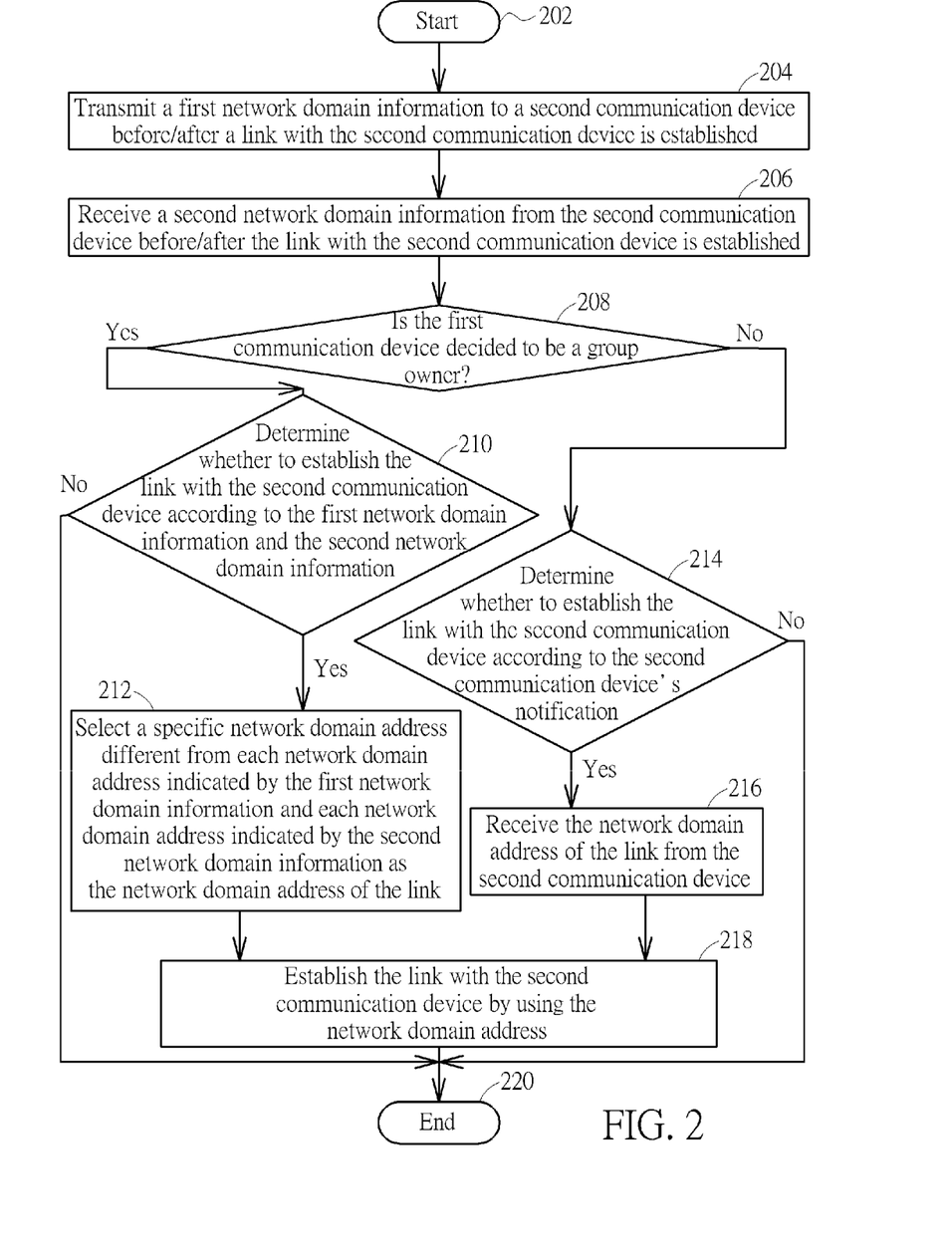
FIG. 2 is a flowchart illustrating a linking method employed by a first communication device according to an embodiment of the present invention.

FIG. 2 is a flowchart illustrating a linking method employed by a first communication device (e.g. one Wi-Fi Direct device) according to an embodiment of the present invention. Provided that substantially the same result is achieved, the steps of the flowchart shown in FIG. 2 need not be in the exact order shown and need not be contiguous; that is, other steps can be intermediate. Some steps in FIG. 2 may be omitted according to various embodiments or requirements. The linking method may include the following steps.

Step 202: Start.

Step 204: Transmit a first network domain information to a second communication device (e.g. another Wi-Fi Direct device) before/after a link with the second communication device is established.

Step 206: Receive a second network domain information from the second communication device before/after the link with the second communication device is established.

Step 208: Determine whether the first communication device is a group owner? If yes, go to step 210; otherwise, go to step 214.

Step 210: Determine whether to establish the link with the second communication device according to the first network domain information and the second network domain information. If yes, go to step 212; otherwise, go to step 220.

Step 212: Select a specific network domain address different from each network domain address indicated by the first network domain information and each network domain address indicated by the second network domain information as the network domain address of the link.

Step 214: Determine whether to establish the link with the second communication device according to the second communication device's notification. If yes, go to step 216; otherwise, go to step 220.

Step 216: Receive the network domain address of the link from the second communication device.

Step 218: Establish the link with the second communication device by using the network domain address.

Step 220: End.

Figure 3:
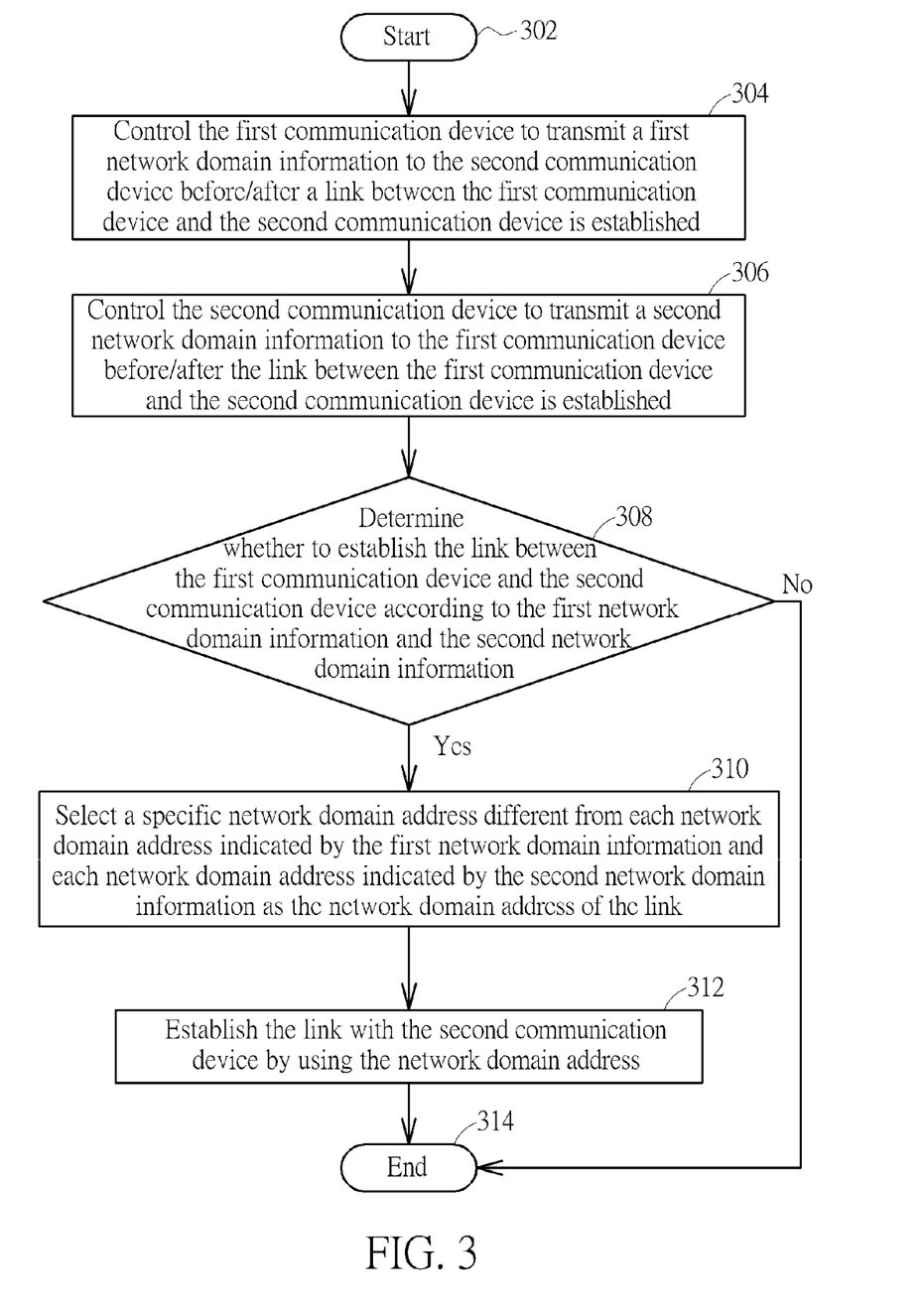
FIG. 3 is a flowchart illustrating a linking method for a communication system according to another embodiment of the present invention.

Please refer to FIG. 3, which is a flowchart illustrating a linking method for a communication system (e.g. the communication system 100 having two Wi-Fi Direct devices 102, 104) according to another embodiment of the present invention. Provided that substantially the same result is achieved, the steps of the flowchart shown in FIG. 3 need not be in the exact order shown and need not be contiguous; that is, other steps can be intermediate. Some steps in FIG. 3 may be omitted according to various embodiments or requirements. The linking method may include the following steps.

Step 302: Start.

Step 304: The first communication device (e.g. one Wi-Fi Direct device) transmits a first network domain information to the second communication device (e.g., another Wi-Fi Direct device) before/after a link between the first communication device and the second communication device is established.

Step 306: The second communication device transmits a second network domain information to the first communication device before/after the link between the first communication device and the second communication device is established.

Step 308: Determine whether to establish the link between the first communication device and the second communication device according to the first network domain information and the second network domain information. If yes, go to step 310; otherwise, go to step 314.

Step 310: Select a specific network domain address different from each network domain address indicated by the first network domain information and each network domain address indicated by the second network domain information as the network domain address of the link.

Step 312: Establish the link with the second communication device by using the selected network domain address.

Step 314: End.

As a person skilled in the art can readily understand the details of the steps shown in FIG. 2 and FIG. 3 after reading the above paragraphs directed to the linking method shown in FIG. 1, further description is omitted here for brevity.

An alternative design of the present invention is disclosed herein. Please refer to FIG. 1 again. Suppose the Wi-Fi Direct device 102 and the Wi-Fi Direct device 104 are performing link formation, and the Wi-Fi Direct device 102 has an existing link (192.168.0.X) with a Wi-Fi AP 106. In this embodiment, after the GO is determined, the GO will determine a network domain address for the new link in a random manner. The GO will generate a network domain address randomly and unilaterally assign the randomly generated network domain address to the new link. Compared with the network domain addresses assigned in the conventional design which are often generated in a serial manner and prone to repeat, the proposed domain address randomization method can dramatically decrease the probability of IP address conflict.

Figure 4:
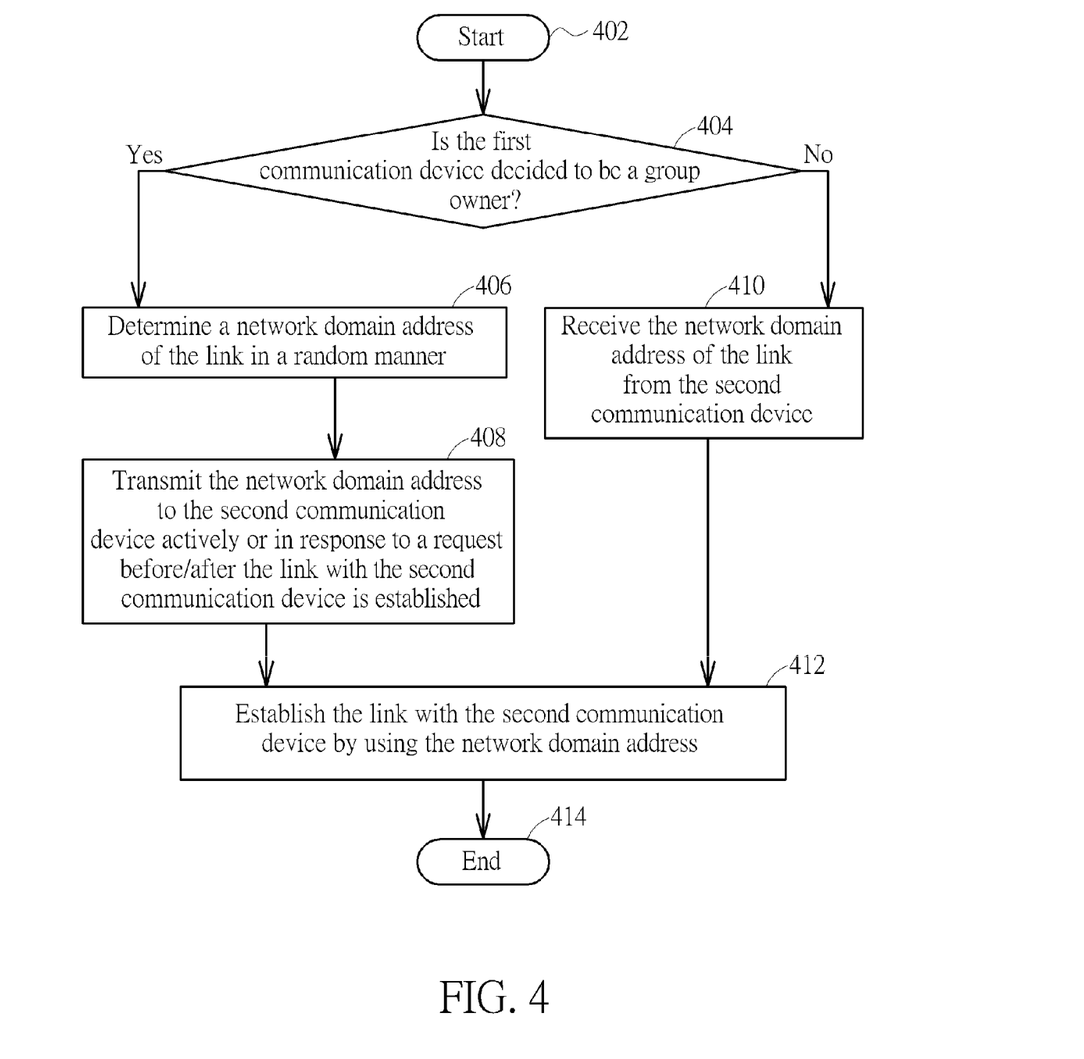
FIG. 4 is a flowchart illustrating a linking method employed by a first communication device according to yet another embodiment of the present invention.

FIG. 4 is a flowchart illustrating a linking method employed by a first communication device (e.g. one Wi-Fi Direct device) according to yet another embodiment of the present invention. Provided that substantially the same result is achieved, the steps of the flowchart shown in FIG. 4 need not be in the exact order shown and need not be contiguous; that is, other steps can be intermediate. Some steps in FIG. 4 may be omitted according to various embodiments or requirements. The linking method may include the following steps.

Step 402: Start.

Step 404: Determine whether the first communication device is a group owner? If yes, go to step 406; otherwise, go to step 410.

Step 406: Determine a network domain address of the link in a random manner.

Step 408: Transmit the network domain address to a second communication device (e.g. another Wi-Fi Direct device) actively or in response to a request before/after the link with the second communication device is established.

Step 410: Receive the network domain address of the link from the second communication device.

Step 412: Establish the link with the second communication device by using the network domain address.

Step 414: End.

Figure 5:
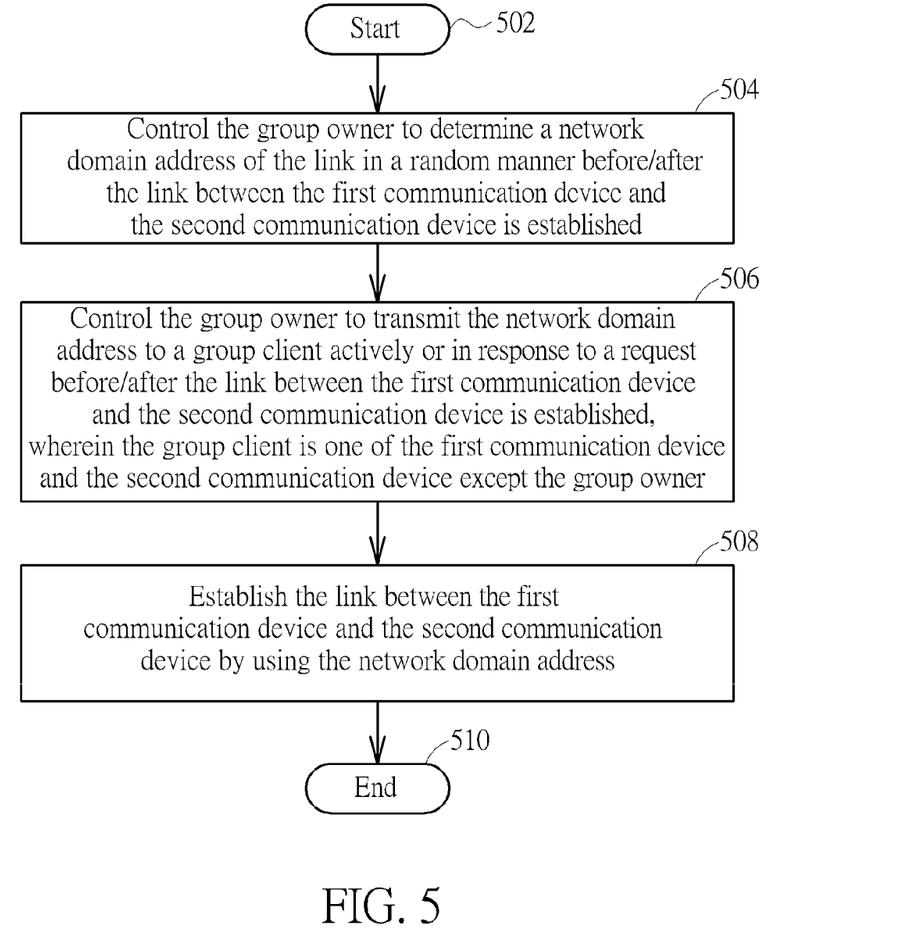
FIG. 5 is a flowchart illustrating a linking method for a communication system according to yet another embodiment of the present invention.

Please refer to FIG. 5, which is a flowchart illustrating a linking method for a communication system (e.g. the communication system 100 having two Wi-Fi Direct devices 102, 104) according to yet another embodiment of the present invention. Provided that substantially the same result is achieved, the steps of the flowchart shown in FIG. 5 need not be in the exact order shown and need not be contiguous; that is, other steps can be intermediate. Some steps in FIG. 5 may be omitted according to various embodiments or requirements. The linking method may include the following steps.

Step 502: Start.

Step 504: The group owner determines a network domain address of the link in a random manner before/after the link between the first communication device and the second communication device (e.g. Wi-Fi Direct devices 102 and 104) is established.

Step 506: The group owner transmits the network domain address to a group client actively or in response to a request of the group clientbefore/after before/after the link between the first communication device and the second communication device is established, wherein the group client is one of the first communication device and the second communication device apart from the group owner.

Step 508: Establish the link between the first communication device and the second communication device by using the network domain address.

Step 510: End.

As a person skilled in the art can readily understand the details of each step shown in FIG. 4 and FIG. 5 after reading the above paragraphs associated with the linking method which randomly generates the network domain address, further description is omitted here for brevity.

Figure 6:
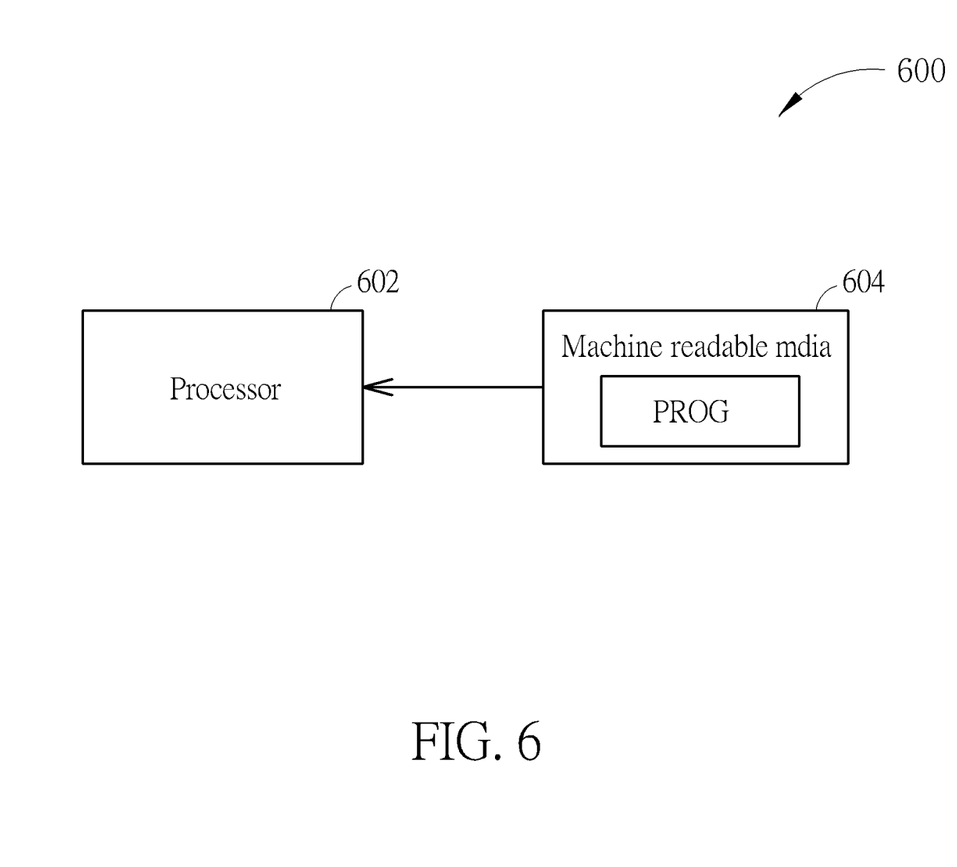
FIG. 6 is a diagram illustrating a computer system for performing a linking method according to an exemplary embodiment of the present invention.

Please refer to FIG. 6, which is a diagram illustrating a computer system for performing a linking method according to an exemplary embodiment of the present invention. The computer system 600 may be implemented in either or both of the Wi-Fi Direct devices 102 and 104. The computer system 600 includes a processor 602 and a non-transitory machine readable medium 604. For instance, the computer system 600 could be a personal computer, and the non-transitory machine readable medium 604 could be any storage device capable of storing data in a personal computer, e.g. volatile memory, non-volatile memory, hard disk, CD-ROM, etc. In this embodiment, the non-transitory machine readable medium 604 stores a program code PROG, wherein when the program code PROG is loaded and executed by the processor 602, the program code PROG enables the processor 602 to perform the disclosed linking method (i.e. steps 202-220 shown in FIG. 2, or steps 402-414 shown in FIG. 4) of the present invention. As those skilled in the art should readily understand the link establish control realized by the processor 602 executing the program code PROG, further description will be omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A linking method employed by a first communication device, comprising:
   transmitting a first network domain information to a second communication device before/after a link with the second communication device is established;
   receiving a second network domain information from the second communication device before/after the link with the second communication device is established; and
   selecting a specific network domain address different from each network domain address indicated by the first network domain information and each network domain address indicated by the second network domain information as a network domain address of the link;
   wherein the first network domain information indicates a network domain address of each link currently used by the first communication device; the second network domain information indicates a network domain address of each link currently used by the second communication device.

2. The linking method of claim 1, further comprising:
   when the first communication device is decided to be a group owner, determining the network domain address of the link according to the first network domain information and the second network domain information.

3. The linking method of claim 1, further comprising:
   when the first communication device is decided to be a group owner, determining whether to establish the link with the second communication device according to the first network domain information and the second network domain information.

4. The linking method of claim 1, wherein the first communication device is a wireless communication device.

5. A linking method for a communication system, wherein the communication system includes a first communication device and a second communication device; the link method comprising:
   transmitting by the first communication device a first network domain information to the second communication device before/after a link between the first communication device and the second communication device is established;
   transmitting by the second communication device a second network domain information to the first communication device before/after the link between the first communication device and the second communication device is established; and
   selecting a specific network domain address different from each network domain address indicated by the first network domain information and each network domain address indicated by the second network domain information as a network domain address of the link;
   wherein the first network domain information indicates a network domain address of each link currently used by the first communication device; the second network domain information indicates a network domain address of each link currently used by the second communication device.

6. The linking method of claim 5, further comprising:
   determining the network domain of the link according to the first network domain information and the second network domain information.

7. The linking method of claim 5, further comprising:
   determining whether to establish the link between the first communication device and the second communication device according to the first network domain information and the second network domain information.

8. The linking method of claim 5, wherein both the first communication device and the second communication are wireless communication devices.

* * * * *